United States Patent [19]
Johnson

[11] Patent Number: 5,577,752
[45] Date of Patent: Nov. 26, 1996

[54] LINEAR TORQUE ACTUATOR

[76] Inventor: Jerome A. Johnson, 1509 W. 2nd Ave., Gary, Ind. 46402-1019

[21] Appl. No.: 467,096

[22] Filed: Aug. 9, 1995

Related U.S. Application Data

[63] Continuation-in-part of Ser. No. 31,650, Mar. 16, 1993, abandoned.
[51] Int. Cl.$^6$ ................................................ B62D 53/06
[52] U.S. Cl. .................................... 280/432; 280/457
[58] Field of Search ................................ 280/455.1, 432, 280/448, 457, 486, 461.1, 446.1

[56] References Cited

U.S. PATENT DOCUMENTS 4,262,920  4/1981  Mettetal ............................. 280/455.1

FOREIGN PATENT DOCUMENTS 1170294  1/1959  France ................................. 280/432
1012530  7/1957  Germany ............................. 280/432

Primary Examiner—Kevin T. Hurley

[57]  ABSTRACT

A device for transmitting torque produced by a cylinder, includes two combination spline shaft members hingedly connected at the inward spline ends thereof to a double acting cylinder member within a shaft guided hollow tube member. Said combination spline shaft members are, operative reciprocatively and counter torsionally, against key embodied effectual connection members meshed thereon when, said cylinder member is reciprocatively enabled and said effectual connection members are firmly held.

3 Claims, 1 Drawing Sheet

LINEAR TORQUE ACTUATOR

RELATED APPLICATION

This is a continuation in part of the application originally filed Mar. 16, 1993; Ser. No. 08/031,650 now abandoned.

TECHNICAL FIELD

This invention relates to new and useful improvements in combination vehicle design, seeking to improve vehicle manageability in emergency maneuvering situations.

1. Background Art

Various devices are illustrated in the prior art for the specific purpose of eliminating jackknifing between pulled trailers and for controlling the dynamic stability between trailers during emergency maneuvering. Typical trailer constructions directed to the foregoing problems are illustrated in the following U.S. Pat. No. 4,262,920; FR No. 1.170.294; DE No. 1012530; BE No. 555822.

2. Summary of the Invention

This invention relates to a tractor and trailer, potential multi-trailer combination or train having two or more connected trailers powered by a tractor. In its present conception, the Linear Torque Actuator is, a trailer mountable, reciprocative, torsional, leverage, brake device for, providing resistance against the potential for lateral momentum and rollover of a trailer during sudden turns and emergency maneuvers. Synchronized to left and right turn input channeling of the motive force from the towing vehicle to the reciprocative engine member of the device, the design dynamic of the invention provides, torsional, leverage, resistance against the momentum of a pulled trailer to carry it sideways, relative to its towing vehicle during a sudden turn, thereby, causing a jack-knifing situation. In the same light, the twist dynamic of the invention, resists, the potential for torsional momentum of a trailer; causing it to rollover. The invention is connectable to a towing vehicle with a coupling device, typical of that in application Ser. No. 08/269,582; comprising, a truck mountable, pivotal, fulcrum actuated embracement assembly for, clasping circumferentially for constraint, the forward serviceable end of the invention when contacted thereat of, the fulcrum members during the coupling process. Further, the coupling device is disposed within a mount member which is supportive of a standard fifthwheel member thereon, relative to, a trailer, suitably outfitted with the present invention and is dependent upon the locking hardware of the fifthwheel member for its effectiveness.

Mountable centrally and longitudinally to the underside hitchable end of a trailer with direct vertical pivotal alignment of the invention universal member with the trailer hitch pivot pin member, the invention embodies, a double acting cylinder as the reciprocatory engine member, positioned, within a hollow tube member and is enabled from the towing vehicle with synchronization to left and right turn input channeling of the motive force, through, suitable conduit connected thereto and leading from a flow control device linked and sychronized to left and right turn inputs at the steering assembly of the towing vehicle. The reciprocatory engine member is, hingedly connected with pin members to, clevis members, comprising, the inward ends of two combination spline shaft members composed of, conjoint rectilinear and helicoidal spline members with the rectilinear spline members, comprising, the inward shaft members and traverse matching, spline guide members, embodying, each of the ends of the hollow tube member. Comprising the outward shaft members, the helicoidal spline members having, opposing inclination support, a forward tractor effectual connection member and a rearward trailer effectual connection member, reciprocatively and counter torsionally thereon with the aid of, spline guided key members, embodied, within the bore of each effectual connection member and is, restricted to each helicoidal shaft member with, retaining members, set in each of the ends of each helicoidal spline member.

The forward tractor effectual connection member is cast being, indistinct, on the surface circumference thereof so as to be, easily engaging and disengaging of a tractor mounted coupling device; typical of the seizable connection previously discussed. The rearward trailer effectual connection member is designed having, levers, extending outward from the helicalized mounting and intersect crosswise, longitudinal structural trailer frame members for, torsion operative, synchronous, leverage resistance to, trailer momentum independent of that of the towing vehicle. Mount bracket members for, mounting the invention in the present conception to a trailer and having, the potential for varied application are, fixedly attached to and circumference each end of the hollow tube member at the spline guide members to further, stiffen the spline guide members against torsion stress; anticipated in the use of the invention. The conjoint spline shaft member effecting the forward tractor effectual connection member is, divided between the differing spline ends thereof and is joined therein with, yoke members attached to the ends thereat and connected with a universal member with, a coil spring member for, maintainability of the rectilinear disposition of the invention, circumference, the joint firmly between the forward tractor effectual connection member and the forward end of the hollow tube member for, effecting articulation of the invention at the connection of the tractor and trailer for, multi-angular torsional operation. Assembly and enabling of the invention is achieved through, an access aperture with an aperture cover member fastenable with bolts disposed, along the length of the hollow tube member and between the mount bracket members.

The invention is made effective when suitably mounted and the reciprocative engine member having correlative enabling is reactive, reciprocatively, with the two conjoint spline shaft members hingedly connected thereto and strictly exerted linearly, inducing, dynamic counter rotational behavior at each of the outward helicoidal spline ends of the key embodied effectual connection members meshed thereon. Understandably, mounted to a trailer in the present conception, the towing vehicle coupled thereto, completes potential in the invention; providing footing for the leverage dynamic, thereby resisting undesired dynamic behavior of a pulled trailer.

Figure 1:
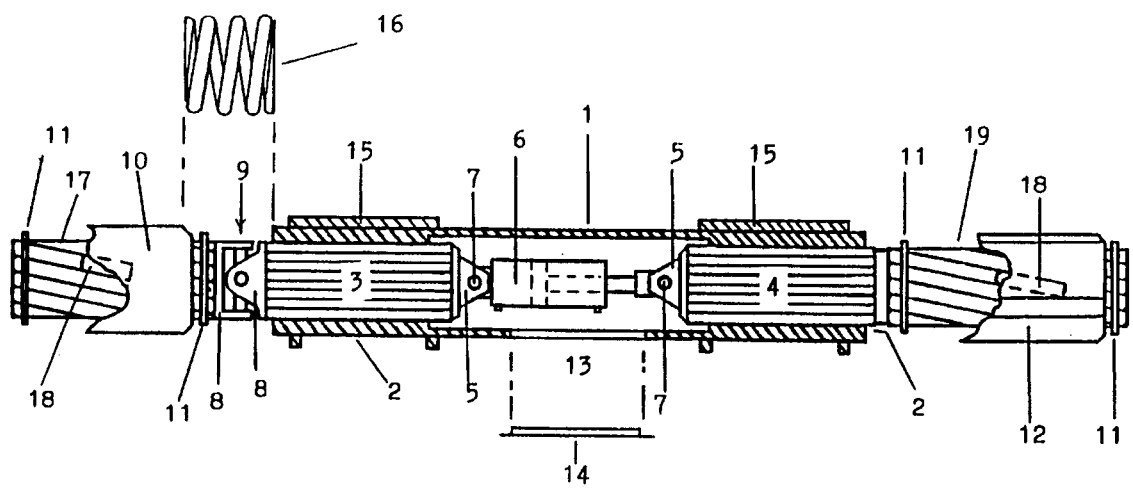
FIG. 1 Longitudinal fractional sectional view of the invention
Figure 2:
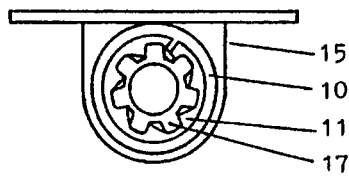
FIG. 2 End view of the tractor connectable end of the invention
Figure 3:
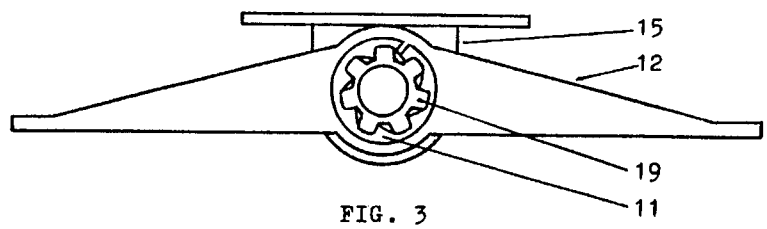
FIG. 3 End view of the trailer connectable end of the invention
Figure 4:
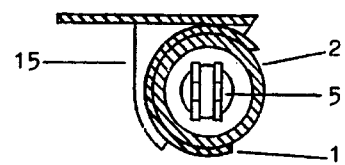
FIG. 4 View of a clevis member within a fractional sectional view of the invention base body member

Best Mode for Carrying Out the Invention

Potentially myriad applications with varied stress characteristics are forecastable in the use of the invention. Conceivability dictates, the use of materials, alloys, light weight and hardenable, to meet the most exacting specifications. Given the nature of the present invention, optimum performance ultimately depends upon, exceptionally close tolerances between its constituent parts.

Proceeding now to describe the invention in detail, it will be seen upon referring to the accompanying drawings that it first comprises a hollow tube member (1) as, the main unifying conduit of the invention. Incorporated at each of the ends of the hollow tube member (1) are, rectilinear spline guide members (2) for piloting, the two conjoint spline shaft members at the rectilinear spline end members (3,4) reciprocatively, against the reciprocative engine member (6) hingedly connected thereto and within said hollow tube member (1). Fixedly attached to circumference the ends of the hollow tube member (1) at the rectilinear spline guide members (2) are, the mount bracket members (15) for, mounting the invention in the present conception to the underside hitchable end of a trailer and potentially in, varied forecastable uses of the invention. The disposition of the mount bracket members (15) stiffen, the spline guide members (2) against torsion stress; inherent in the use of the invention. The hollow tube member (1) is further, outfitted along the length thereof and between the mount bracket members (15) with, an access port member (13) and an access port cover member (14) fastenable with bolts for, facilitating assembly and enabling of the reciprocative engine member (6). Conceivably, the reciprocative engine member (6) is, enabled at the towing vehicle using, a suited conduit means connective to a flow control device linked to the steering mechanism of the towing vehicle and synchronized to left and right turn input channeling of the motive force to the reciprocative engine member (6). The rectilinear spline end members (3,4) of the conjoint spline shaft members are, equipped on the inward ends thereof with clevis members (5) and are, hingedly connected thereat and within the hollow tube member (1) to, each end of the reciprocative engine member (6) with, pin members (7). The outward spline ends of the two conjoint spline shaft members (17,19) being helicoidal are, disposed in opposing inclination and support reciprocatively and counter rotationally; the forward tractor effectual connection member (10) and the rearward trailer effectual connection member (12) against key members (18) embodied therein. Both the forward tractor effectual connection member and the rearward trailer effectual connection member (10,12) are, restricted to the helicoidal spline end members (17,19) with, retaining members (11) set in each of the ends of the helicoidal spline end members (17,19). The rearward trailer effectual connection member (12) is, designed having levers extending outward from the helicoidal mounting for, intersecting crosswise, longitudinal structural trailer frame members for, torsional leverage resistance against the potential for trailer rollover and lateral momentum; during sudden turns and emergency maneuvers. The design of the forward tractor effectual connection member (10) is, indistinct, on the surface circumference thereof for, seizable connectability at the towing vehicle, utilizing; a coupling device typical of that previously discussed. Designate, the forward conjoint spline shaft member, is, divided between the differing spline members (17,3) and is, jointed therein with, yoke members (8) and a universal member (9) thereby, forming a joint and permitting multi-angular torsional performance of the invention. Given the nature of the universal joint member to be limber and supportive of the forward tractor effectual connection assemblage, the universal joint member is, circumferenced around with, a coil spring member (16) firmly positioned between the forward tractor effectual connection member (10) and the forward end of the hollow tube member (1) for; maintaining the rectilinear disposition of the invention. Ideal mounting of the invention in the present conception requires that, the invention be bolted to the underside hitchable end of a trailer with, the extensions of the rearward trailer effectual connection member traversing, longitudinal structural frame members and the vertical center line of the universal member being, positively vertically aligned with, the vertical center line of the accompanying trailer pivot pin member.

While the foregoing specification sets forth the invention in specific terms, it is to be understood that numerous changes in shape, size and materials may be resorted to without departure from the spirit and scope of the invention as claimed hereinafter.

What is claimed is:

1. A linear torque actuator for use in a steering stabilizer device comprising in combination: a hollow tube member having a first end and a second end and having incorporated at each of the ends thereof, a first and a second spline guide member for piloting, reciprocatively, a first and a second combination spline shaft member, each comprising a conjoint rectilinear spline end member and a helicoidal spline end member, a first and a second clevis member fixedly attached at the inward spline ends thereof for pivotally connecting said conjoint spline shaft members within said hollow tube member with a first and a second connecting pin member to a reciprocative engine member positioned within said hollow tube member and adapted to be connected to a flow control device linked to the towing vehicle steering mechanism with synchronization thereof, a first and a second mount bracket member fixedly attached to and surrounding the ends of the hollow tube member at the spline guide members for mounting the invention longitudinally to the underside hatchable end of a trailer with the vertical center line of the universal member disposed in positive vertical pivotal alignment with the pivotal member of the accompanying trailer, an access aperture member and an aperture cover member disposed alone the length of the hollow tube member and between said first and said second mount bracket members and fissionable thereat with bolts for facilitating assembly of the invention and enabling of said reciprocative engine member, a first and a second effectual connection member being keyed internally and meshed torsionally and reciprocatively on the outward spline ends of said first and said second conjoint spline shaft members and is restricted thereto with, a first and a second retaining member disposed in each of the ends of said outward spline ends before and after each effectual connection member mounted thereon for constraining said effectual connection members thereon with said first effectual connection member being indistinct on the surface circumference thereof for easy engagement of a truck mountable seizing coupling and said second or rearward trailer effectual connection member having levers extending symmetrically outward from the rearward outward spline end for mounting and traversing longitudinal structural frame members of a trailer for, reciprocative helical operative leverage resistance against trailer lateral momentum, a first and a second yoke member and a universal member joining one of the rectilinear spline end members to the first helicoidal spline shaft member thereby creating a joint in the invention and effecting manifold angular torsional performance therein, and a coil spring aligning member positioned firmly between said first effectual connection member and the forward end of said hollow tube member.

2. The linear torque actuator according to claim 1, wherein said reciprocative engine member comprises a double acting cylinder.

3. The linear torque actuator in accordance with claim 1, wherein the first and the second spline guide members have internal rectilinear splines.

* * * * *